United States Patent
Shao et al.

(10) Patent No.: US 11,754,410 B1
(45) Date of Patent: Sep. 12, 2023

(54) METHODS AND INTERNET OF THINGS SYSTEMS FOR DETERMINING GOVERNMENT TRAFFIC ROUTES IN SMART CITIES

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/815,569

(22) Filed: Jul. 27, 2022

(30) Foreign Application Priority Data

Jul. 11, 2022 (CN) .......................... 202210807146.1

(51) Int. Cl.
*G01C 21/34* (2006.01)
*G16Y 10/40* (2020.01)
(Continued)

(52) U.S. Cl.
CPC ....... *G01C 21/3492* (2013.01); *G01C 21/343* (2013.01); *G08G 1/0129* (2013.01); *G16Y 10/40* (2020.01); *G16Y 20/10* (2020.01)

(58) Field of Classification Search
CPC .............. G01C 21/3492; G01C 21/343; G08G 1/0129; G16Y 10/40; G16Y 20/10
See application file for complete search history.

(56) References Cited

U.S. PATENT DOCUMENTS

2004/0225437 A1  11/2004  Endo et al.
2008/0229374 A1   9/2008  Mick et al.
(Continued)

FOREIGN PATENT DOCUMENTS

CN   1536514 A   10/2004
CN   101944095 A   1/2011
(Continued)

OTHER PUBLICATIONS

Decision to Grant a Patent for Invention in Chinese Application No. 20221080146.1 dated Aug. 29, 2022, 6 pages.
(Continued)

*Primary Examiner* — Rami Khatib
(74) *Attorney, Agent, or Firm* — METIS IP LLC

(57) ABSTRACT

The present disclosure provides a method and an Internet of Things system for determining a government traffic route in a smart city. The method may include: receiving a query request for a preset route initiated by a user, transmitting the query request to the government traffic route determination management platform, generating a query instruction, issuing the query instruction to the government sensor network platform, sending the query instruction to corresponding object platform, obtaining the traffic data information according to the query instruction, uploading the traffic data information to the government traffic route determination management platform, determining the time when each preset route reaches the target location, and feeding back the time when each preset route reaches the target location to the citizen user platform through the government service platform.

6 Claims, 5 Drawing Sheets

(51) Int. Cl.
*G16Y 20/10* (2020.01)
*G08G 1/01* (2006.01)

(56) References Cited

U.S. PATENT DOCUMENTS

| | | | |
|---|---|---|---|
| 2015/0294431 A1* | 10/2015 | Fiorucci | G07B 15/02 |
| | | | 705/13 |
| 2020/0160695 A1 | 5/2020 | Liu et al. | |
| 2020/0284594 A1 | 9/2020 | Wang et al. | |
| 2020/0331465 A1 | 10/2020 | Herman et al. | |
| 2022/0100756 A1 | 3/2022 | Bodigutla et al. | |

FOREIGN PATENT DOCUMENTS

| | | |
|---|---|---|
| CN | 102709984 A | 10/2012 |
| CN | 104021674 A | 9/2014 |
| CN | 106297357 A | 1/2017 |
| CN | 107154150 A | 9/2017 |
| CN | 107230351 A | 10/2017 |
| CN | 110675621 A | 1/2020 |
| CN | 110675625 A | 1/2020 |
| CN | 111094894 A | 5/2020 |
| CN | 106297291 B | 6/2020 |
| CN | 111833650 A | 10/2020 |
| CN | 112382099 A | 2/2021 |
| CN | 113159457 A | 7/2021 |
| CN | 110050300 B | 8/2021 |
| CN | 113965590 A | 1/2022 |
| CN | 114241762 A | 3/2022 |
| CN | 114418468 A | 4/2022 |
| WO | 2020232732 A1 | 11/2020 |

OTHER PUBLICATIONS

White Paper on Urban Brain Development, Smart City Standard Working Group of National Beacon Commission, 2022, 59 pages.
Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
First Office Action in Chinese Application No. 202210807146.1 dated Aug. 11, 2022, 26 pages.

* cited by examiner

300

310
Receiving the query request for the preset route initiated by the user based on the citizen user platform 320
Transmitting the query request to the government traffic route determination management platform based on the government service platform, and generating an inquiry instruction based on the government traffic route determination management platform, the inquiry instruction including the time that each preset route reaches the target location 330
Sending the query instruction to the main platform of the government sensor network platform based on the government traffic route determination management platform, issuing the query instruction to the corresponding sub-platforms platform of the government sensor network platform by the main platform of the government sensor network platform according to the type of traffic data information 340
Sending the query instruction to the corresponding object platform by the government sensor network platform 350
Obtaining the traffic data information based on the at least one object platform according to the query instruction, wherein the traffic data information includes the itinerary information of the user, the vehicle information of the preset route, and the channel information of the preset channel 360
Uploading the traffic data information to the government traffic route determination management platform through corresponding sub-platforms of the government sensor network platform and the main platform of the government sensor network platform respectively based on the object platform, determining the time when each preset route reaches the target location based on the traffic data information by the government traffic route determination management platform 370
Determining the time when each preset route reaches the target location through a time prediction model based on the traffic data information by the government traffic route determination management platform.

FIG. 3

METHODS AND INTERNET OF THINGS SYSTEMS FOR DETERMINING GOVERNMENT TRAFFIC ROUTES IN SMART CITIES

CROSS-REFERENCE TO RELATED APPLICATION

This application claims priority of Chinese Patent Application No. 202210807146.1, filed on Jul. 11, 2022, the contents of which are entirely incorporated herein by reference.

TECHNICAL FIELD

The present disclosure relates to the field of Internet of Things and cloud platform, and more particularly to a method and an Internet of Things system for determining a government traffic route in a smart city.

BACKGROUND

With the continuous development of social economy, the number of domestic travelers and international travelers is increasing day by day. During peak periods, there are serious queues at toll stations set up on expressways or entry and exit gates set up in different countries, which greatly increases the travel time of citizens.

Therefore, it is hoped to provide a method and an Internet of Things system for determining a government traffic route in a smart city, which utilizes the Internet of Things and cloud platform to help citizens plan their travel routes reasonably, so as to reduce the time it takes for citizens to reach the target location and improve travel efficiency. At the same time, it can also achieve a certain diversion effect to reduce congestion at domestic or international gateways.

SUMMARY

One or more embodiments of the present disclosure provide a method for determining a government traffic route in a smart city, implemented based on an Internet of Things system for determining the government traffic route in the smart city. The Internet of Things system for determining the government traffic route in the smart city may include a citizen user platform, a government service platform, a government traffic route determination management platform, a government sensor network platform, and at least one object platform. The method may include follow operations: a query request for a preset route initiated by a user may be received based on the citizen user platform, the query request may be transmitted to the government traffic route determination management platform based on the government service platform, and a query instruction may be generated based on the government traffic route determination management platform, the query instruction includes a time when each preset route reaches a target location, the query instruction may be sent to a main platform of the government sensor network platform based on the government traffic route determination management platform, the query instruction may be sent to sub-platforms of the government sensor network platform based on a type of traffic data information by the main platform of the government sensor network platform, different sub-platforms of the government sensor network platform may be used for data storage, data processing, and/or data transmission for data of different object platforms by the government sensor network platform, the different sub-platforms of the government sensor network platform correspond to different traffic data information, the query instruction may be sent to corresponding object platform based on the sub-platforms of the government sensor network platform, the traffic data information may be obtained based on the at least one object platform according to the query instruction, the traffic data information includes itinerary information of the user, vehicle information of the preset route, and the channel information of a preset channel, the traffic data information may be uploaded to the government traffic route determination management platform through corresponding sub-platforms of the government sensor network platform and the main platform of the government sensor network platform respectively based on the object platform, the time when each preset route reaches the target location may be determined based on the traffic data information by the government traffic route determination management platform, and the time when each preset route reaches the target location may be fed back to the citizen user platform through the government service platform based on the government traffic route determination management platform.

In some embodiments, the time when each preset route reaches the target location may be determined based on the traffic data information by the government traffic route determination management platform including operation: the time when each preset route reaches the target location through a time prediction model may be determined based on the traffic data information by the government traffic route determination management platform.

In some embodiments, the itinerary information of the user at least may include: a current location, a current time, and the target location.

In some embodiments, the vehicle information at least may include vehicle speed, traffic flow, and vehicle type distribution.

In some embodiments, the channel information of the preset channel at least may include initial passing time of the preset channel, and a transition matrix of the preset route and the preset channel.

In some embodiments, an output of the time prediction model further may include a passing time of each preset channel.

In some embodiments, a structure of the time prediction model may include a first embedding layer, a traffic flow distribution layer, and an arrival time output layer.

In some embodiments, the structure of the time prediction model further may include a second embedding layer, a queuing distribution layer, and a channel passing time output layer.

In some embodiments, a flow vector output by the traffic flow distribution layer may be used as an input of the channel passing time output layer, and a queuing vector output by the queuing distribution layer may be used as an input of the arrival time output layer.

In some embodiments, a training of the time prediction model may include constructing a first loss function and a second loss function, a weight of the time when each preset route reaches the target location in the first loss function is larger, and a weight of the passing time of each preset channel is larger in the second loss function, the weight of the first loss function and the weight of the second loss function may alternately be adjusted; and above operations may iteratively be performed until the time prediction model satisfies a preset condition.

One or more embodiments of the present disclosure provide an Internet of Things system for determining a government traffic route in a smart city, the Internet of Things system may include a citizen user platform, a government service platform, a government traffic route determination management platform, a government sensor network platform, and at least one object platform. The citizen user platform may be configured to receive a query request for a preset route initiated by a user, the government service platform may be configured to transmit the query request to the government traffic route determination management platform, and generate a query instruction based on the government traffic route determination management platform, the query instruction includes a time when each preset route reaches a target location, the government traffic route determination management platform may be configured to send the query instruction to a main platform of the government sensor network platform, the main platform of the government sensor network platform may be configured to send the query instruction to sub-platforms of the government sensor network platform based on a type of traffic data information, the sub platforms of the government sensor network may be configured to send the query instruction to the corresponding object platform, the government sensor network platform may be configured to use different sub-platforms of the government sensor network platform for data storage, data processing, and/or data transmission for data of different object platforms, the different sub-platforms of the government sensor network platform correspond to different traffic data information, the at least one object platform may be configured to obtain the traffic data information according to the query instruction, the traffic data information includes itinerary information of the user, vehicle information of the preset route, and the channel information of a preset channel, the at least one object platform may be configured to upload the traffic data information to the government traffic route determination management platform through corresponding sub-platforms of the government sensor network platform and the main platform of the government sensor network platform respectively, the government traffic route determination management platform may further be configured to determine the time when each preset route reaches the target location based on the traffic data information, and the government traffic route determination management platform may further be configured to feed back the time when each preset route reaches the target location to the citizen user platform through the government service platform.

One or more embodiments of the present disclosure provide a non-transitory computer-readable storage medium storing a set of instructions, when executed by at least one processor, causing the at least one processor to perform the method for determining a government traffic route in a smart city.

In order to overcome the low travel efficiency of citizen users and the problem of channel congestion during peak periods. Through the method for determining a government traffic route in a smart city, the route from the user's current location to the target location and the time to reach the target location can be recommended to the user. The citizen users can choose a more reasonable route according to the recommended information, which may reduce the time it takes for citizen users to reach the target location, improve travel efficiency, and also achieve a certain diversion effect and reduce channel congestion. In addition, the government traffic route determination management platform can also keep real-time updates of the time when each preset route reaches the target location during the user's driving process, thereby providing more accurate reference information and improving user experience.

BRIEF DESCRIPTION OF THE DRAWINGS

The present disclosure may be further explained by way of exemplary embodiments, which may be described in detail by means of the accompanying drawings. These examples are not limiting, in these examples, the same numbers refer to the same structures, wherein:

FIG. 3 illustrates an exemplary flowchart of a method for determining a government traffic route in a smart city according to some embodiments of the present disclosure;

DETAILED DESCRIPTION

Figure 1:
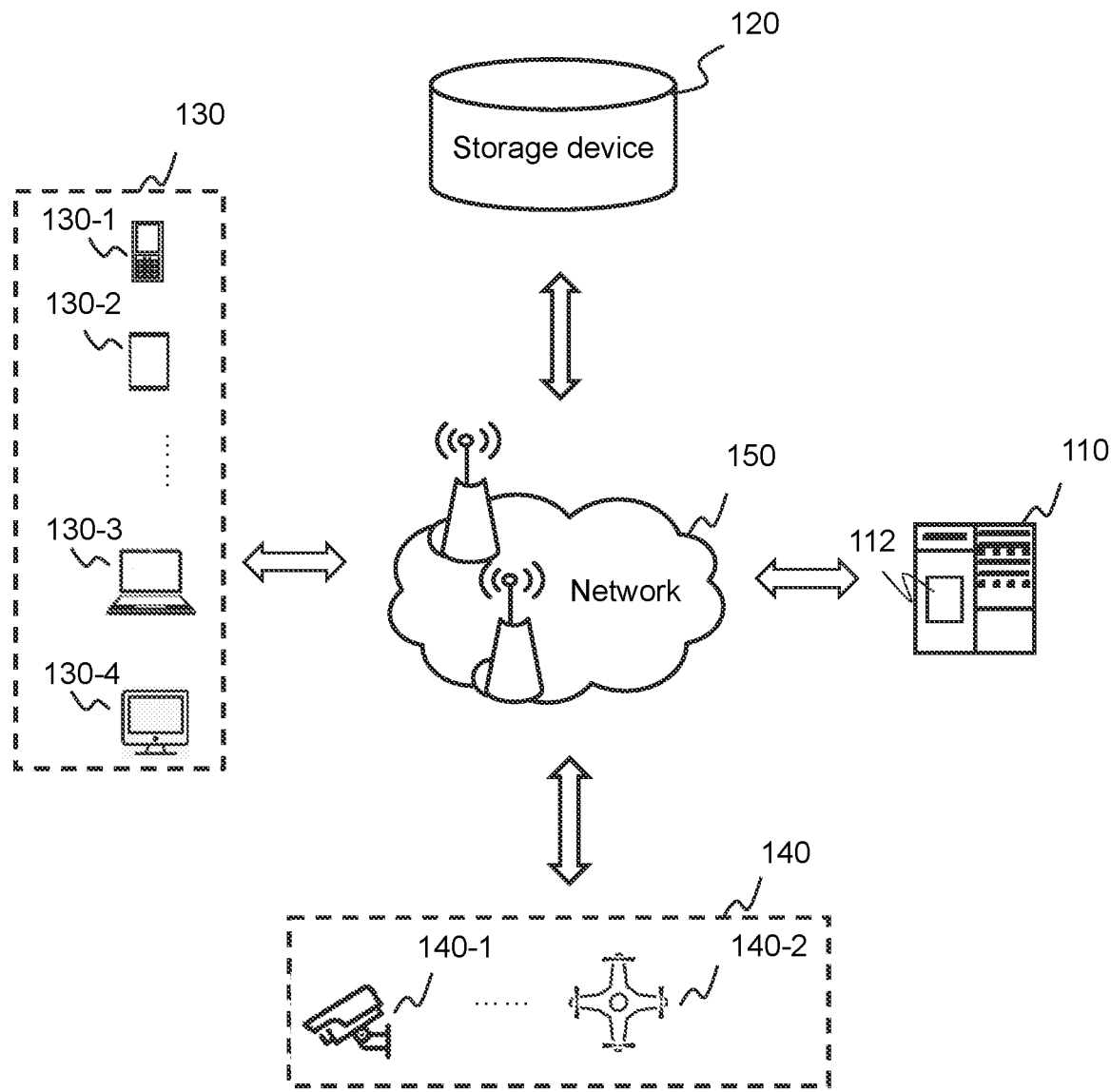
FIG. 1 illustrates a schematic diagram of an application scenario of an Internet of Things system for determining a government traffic route in a smart city according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", and/or "the" do not only specifically refer to the singular, but also include the plural. Generally speaking, the terms "including" and "contain" only suggest that the operations and elements that have been clearly identified are included, and these operations and elements do not constitute an exclusive list, and the method or device may also include other operations or elements.

Flowcharts are used in the present disclosure to describe operations performed by a system according to an embodiment of the present disclosure. It should be understood that the preceding or following operations are not necessarily performed in the exact order. Instead, the various operations may be processed in reverse order or simultaneously. Also, other operations may be added to these procedures, or an operation or operations may be removed from these procedures.

FIG. 1 illustrates a schematic diagram of an application scenario of an Internet of Things system for determining a government traffic route in a smart city according to some embodiments of the present disclosure. In some embodiments, the Internet of Things system 100 for determining a government traffic route in a smart city may include a server 110, a storage device 120, a user terminal 130, a sensing device 140, and a network 150.

In some embodiments, the server 110 may be a single server or a group of servers. The group of servers may be centralized or distributed. For example, the server 110 may be a distributed system. In some embodiments, the server 110 may be local or remote. In some embodiments, the server 110 may be implemented on a cloud platform. In some embodiments, the server 110 or a portion of the server 110 may be integrated into the sensing device 140.

In some embodiments, the server 110 may include a processing device 112. The processing device 112 may be used to obtain and analyze the collected information to perform one or more of the functions described in the application. For example, the processing device 112 may obtain the traffic data information monitored by the sensing device 140 and combine with the query request for a preset route initiated by the user terminal 130 to generate the corresponding arrival time and provide the arrival time to the user, so as to facilitate the user to reasonably plan the travel route.

In some embodiments, the processing device 112 may include one or more processing engines (e.g., a single-chip processing engine or a multi-chip processing engine). As an example only, the processing device 112 may include a central processing unit (CPU), an application specific integrated circuit (ASIC), or the like, or any combination thereof.

The storage device 120 may be used to store data and/or instructions, for example, the storage device 120 may be used to store traffic data information monitored by the sensing device 140. The storage device 120 may obtain data and/or instructions from, for example, the server 110, the user terminal 130, or the like. In some embodiments, the storage device 120 may store data and/or instructions that the processing device 112 executes or uses to accomplish the example methods described in the present disclosure.

The user terminal 130 may refer to a terminal used by a user to input and query information such as a time when each preset route reaches a target location. For example, the user terminal 130 may include, but is not limited to, one of a smart phone 130-1, a tablet computer 130-2, a laptop computer 130-3, a processor 130-4, and other devices with input and/or output functions, or any combination thereof. In some embodiments, the user terminal 130 may be associated with the server 110. For example, the server 110 may obtain the itinerary information of the user through the user terminal 130. In some embodiments, the user terminal 130 may be one or more users, which may include users who directly use the service, and may also include other related users.

The sensing device 140 may refer to a device for obtaining traffic data information. For example, the sensing device 140 may include, but is not limited to, a road monitoring device 140-1 and a drone photography device 140-2. In some embodiments, the road monitoring device 140-1 may be an infrared camera, a high-definition digital camera. In some embodiments, the drone photography device 140-2 may be an unmanned aerial vehicle steered using a radio remote control device. For example, the drone photography device 140-2 may include a multi-rotor drone, an unmanned helicopter, a solar-powered drone, or the like.

The network 150 may provide a channel for the exchange of information and/or data. In some embodiments, the server 110, the storage device 120, the user terminal 130, and the sensing device 140 may exchange information through the network 150. For example, the server 110 may receive a request sent by the user terminal 130 for querying information such as the time when each preset route reaches the target location through the network 150. For another example, the server 110 may obtain the traffic data information uploaded by the sensing device 140 through the network 150 and store the traffic data information in the storage device 120.

It should be noted that the Internet of Things system 100 for determining a government traffic route in a smart city is provided for illustrative purposes only and is not intended to limit the scope of the application. For those skilled in the art, various modifications or changes may be made based on the description of the present disclosure. For example, the Internet of Things system 100 for determining a government traffic route in a smart city may also include a database. As another example, the Internet of Things system 100 for determining a government traffic route in a smart city may be implemented on other devices to achieve similar or different functions. However, such changes and modifications do not depart from the scope of the present disclosure.

The Internet of Things system is a kind of information processing system including some or all of platforms in a user platform, a service platform, a management platform, a sensor network platform, and an object platform. The user platform is the leader of the entire Internet of Things operating system, which may be used to obtain user requirements. The user requirements are the basis and premise of the formation of the Internet of Things operating system, and the connection between the various platforms of the Internet of Things system is to meet the requirements of users. The service platform is a bridge between the user platform and the management platform to realize the connection between the user platform and the management platform. The service platform may provide users with input and output services. The management platform may realize the overall planning and coordination of the connection and cooperation between various functional platforms (such as the user platform, the service platform, the sensor network platform, and the object platform). The management platform may gather the information of the Internet of Things operation system and provide perception management and control management functions for the Internet of Things operation system. The sensor network platform may realize the connection the management platform and the object platform, which plays the functions of perception information sensing communication and control information sensing communication. The object platform is a functional platform for the generation of perception information and the execution of control information.

The processing of information in the Internet of Things system may be divided into a processing flow of perception information and a processing flow of control information, and the control information may be information generated based on the perception information. The processing of perception information is that the object platform obtains the perception information and transmits the perception information to the management platform through the sensor network platform. The management platform may transmit the calculated perception information to the service platform, and finally transmits it to the user platform. The user generates control information after judging and analyzing the perception information. The control information may be generated by the user platform and sent to the service platform, and the service platform then transmits the control information to the management platform. The management platform may calculate and process the control information and send the control information to the object platform through the sensor network platform, so as to realize the control of the corresponding object.

In some embodiments, when the Internet of Things system is applied to city management, it may be referred to as Internet of Things system in a smart city.

Figure 2:
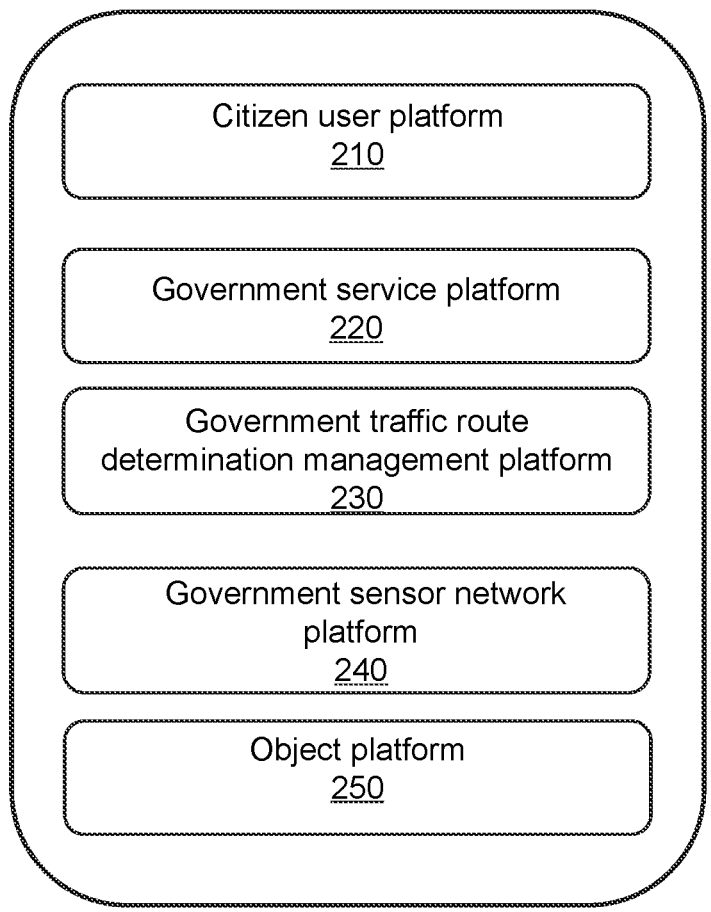
FIG. 2 illustrates an exemplary structural diagram of an Internet of Things system for determining a government traffic route in a smart city according to some embodiments of the present disclosure.

FIG. 2 illustrates an exemplary structural diagram of an Internet of Things system for determining a government traffic route in a smart city according to some embodiments of the present disclosure. As shown in FIG. 2, the Internet of Things system 100 for determining a government traffic route in a smart city includes a citizen user platform 210, a government service platform 220, a government traffic route determination management platform 230, a government sensor network platform 240, and at least one object platform 250. In some embodiments, the Internet of Things system 100 for determining a government traffic route in a smart city may be part of the server 110 or implemented by the server 110.

In some embodiments, the Internet of Things system 100 for determining a government traffic route in a smart city may be applied to various scenarios of traffic route determination. In some embodiments, the Internet of Things system 100 for determining a government traffic route in a smart city may obtain a query instruction based on a query request for a preset route initiated by a user and obtain a query result according to the query instruction. In some embodiments, the Internet of Things system 100 for determining a government traffic route in a smart city may predict the time for each preset route reaches the target location based on the query request information of the preset route.

The various scenarios of the Internet of Things system for determining a government traffic route in a smart city may include, for example, domestic travel scenarios, international travel scenarios, or the like. It should be noted that the above scenarios are only examples, and do not limit the specific application scenarios of the Internet of Things system 100 for determining a government traffic route in a smart city. Those skilled in the art can apply the Internet of Things system 100 for determining a government traffic route in a smart city to any other suitable scenarios on the basis of the content disclosed in the embodiment.

In some embodiments, the Internet of Things system 100 for determining a government traffic route in a smart city may be applied to domestic travel. When applied to domestic travel, the government traffic route determination management platform may be used to collect a query request and traffic data information of the preset route, and based on the above information, determine the time when each preset route for domestic travel reaches the target location and the passage time of each toll station.

In some embodiments, the Internet of Things system 100 for determining a government traffic route in a smart city may be applied to international travel. When applied to international travel, the government traffic route determination management platform may be used to collect a query request and traffic data information of the preset route, and based on the above information, determine the time for each preset route of international travel reaches the target location and the passage time of each entry and exit gates.

The following may take the application of the Internet of Things system 100 for determining a government traffic route in a smart city to a domestic travel scenario as an example to describe the Internet of Things system 100 for determining a government traffic route in a smart city in detail.

The citizen user platform 210 may be a user-oriented service interface. In some embodiments, the citizen user platform 210 may receive a query request for a preset route initiated by a user. In some embodiments, the citizen user platform 210 may be configured to feed back the query results to the user. In some embodiments, the citizen user platform 210 may send the query request to the government service platform. In some embodiments, the citizen user platform 210 may receive such as the query results sent by the government service platform.

The government service platform 220 may be a platform for preliminary processing of the query request. In some embodiments, the government service platform 220 may transmit the query request to the government traffic route determination management platform and generate a query instruction based on the government traffic route determination management platform, and the query instruction include the time when each preset route reaches the target location. In some embodiments, the government service platform 220 may receive the query results sent by the government traffic route determination management platform.

The government traffic route determination management platform 230 may refer to an Internet of Things platform that overall plans and coordinates the connection and cooperation between various functional platforms and provides perception management and control management.

In some embodiments, the government traffic route determination management platform 230 may also determine the time when the preset route reaches the target location according to the traffic data information uploaded by the government sensor network platform. Through the government service platform, the result of the time when the preset route reaches the target location may be fed back to the citizen user platform.

In some embodiments, the government traffic route determination management platform 230 may generate a query instruction. In some embodiments, the government traffic route determination management platform 230 may issue the query instruction to the main platform of the government sensor network platform. In some embodiments, the government traffic route determination management platform 230 may receive the query request sent by the government service platform.

In some embodiments, the government traffic route determination management platform 230 may further be configured to determine the time when each preset route reaches the target location through a time prediction model based on the traffic data information. For a specific description of the time prediction model, please refer to FIG. 5 and its related descriptions.

The government sensor network platform 240 may be a platform for realizing interactive connection between the government traffic route determination management platform and the at least one object platform. In some embodiments, the government sensor network platform 240 may receive the query instruction sent by the government traffic route determination management platform. In some embodiments, the government sensor network platform 240 may send the query instruction to the corresponding object platform. In some embodiments, the government sensor network platform 240 may adopt a front split arrangement, the front split arrangement may include one main platform of the government sensor network platform and a plurality of sub-platforms of the government sensor network. The plurality of sub-platforms of the government sensor network may store and process different traffic data information sent by the object platform respectively. A main platform of the government sensor network platform may aggregate and store and process the data of the plurality of sub-platforms of the government sensor network and transmit the data to the government traffic route determination management platform.

The object platform 250 may be a functional platform for the generation of perception information and the final execution of control information. The object platform 250 may be used to obtain traffic data information based on the query instruction. The traffic data information may include the itinerary information of a user, the vehicle information of the preset route, the channel information of the intended channel, or the like. In some embodiments, the object platform 250 may further upload the traffic data information to the government traffic route determination management platform through the corresponding sub-platforms of the government sensor network and main platform of the government sensor network, respectively.

The determination of government traffic route in a smart city is implemented through the Internet of Things functional architecture of five platforms, so that the traffic route planning of the travel of the user is more reasonable, the street congestion is reduced, and the travel experience of the user is improved at the same time.

For those skilled in the art, after understanding the principle of the system, it is possible to transfer the Internet of Things system 100 for determining a government traffic route in a smart city to any other suitable without departing from the principle.

It should be noted that the above descriptions of the system and its components is only for the convenience of description, and not limit the present disclosure to the scope of the illustrated embodiments. It can be understood that for those skilled in the art, after understanding the principle of the system, it is possible to arbitrarily combine the various components, or form a subsystem to connect with other components without departing from the principle. For example, each component may share one storage device, and each component may also have its own storage device. Such deformations are within the scope of protection of the present disclosure.

FIG. 3 illustrates an exemplary flowchart of a method for determining a government traffic route in a smart city according to some embodiments of the present disclosure. As shown in FIG. 3, the process 300 may include the following operations. In some embodiments, one or more operations of the process 300 shown in FIG. 3 may be implemented in the Internet of Things system 100 for determining a government traffic route in a smart city shown in FIG. 1. For example, the process 300 shown in FIG. 3 may be stored in the storage device 120 in the form of instructions and invoked and/or executed by the processing device 110.

In operation 310, the query request for the preset route initiated by the user may be received based on the citizen user platform. In some embodiments, the operation 310 may be performed by citizen user platform 210.

The preset route may refer to a route that the user may select when going from the current location to the target location. In some embodiments, the preset route may include one or more routes. For example, when the user may go from the current location A to the target location B through the channel C, and the user may also go from the current location A to the target location B through the channel D, the route A-C-B and A-D-B may both be called as the preset route.

The query request may refer to an instruction initiated by the user to the platform. For example, the query request may include the query content such as the time when each preset route reaches the target location.

In some embodiments, the query request may be obtained by the user inputting on the user terminal, and the user terminal as a citizen user platform may receive the query request at this time. For example, the user may input "querying the time required for each route from A to B" on the mobile phone, and the mobile phone as a citizen user platform successfully receives the query request initiated by the user for the time of each preset route from A to the target location B.

In operation 320, the query request may be transmitted to the government traffic route determination management platform based on the government service platform, and an inquiry instruction may be generated based on the government traffic route determination management platform, and the inquiry instruction includes the time that each preset route reaches the target location. In some embodiments, the operation 320 may be performed by the government service platform 220.

The query instruction may refer to the content information extracted from the query request that may be identified by the system. For example, the query instruction may include information such as query time. For example, the query instruction may be a matrix and/or a data table composed of information such as the query time.

Figure 4:
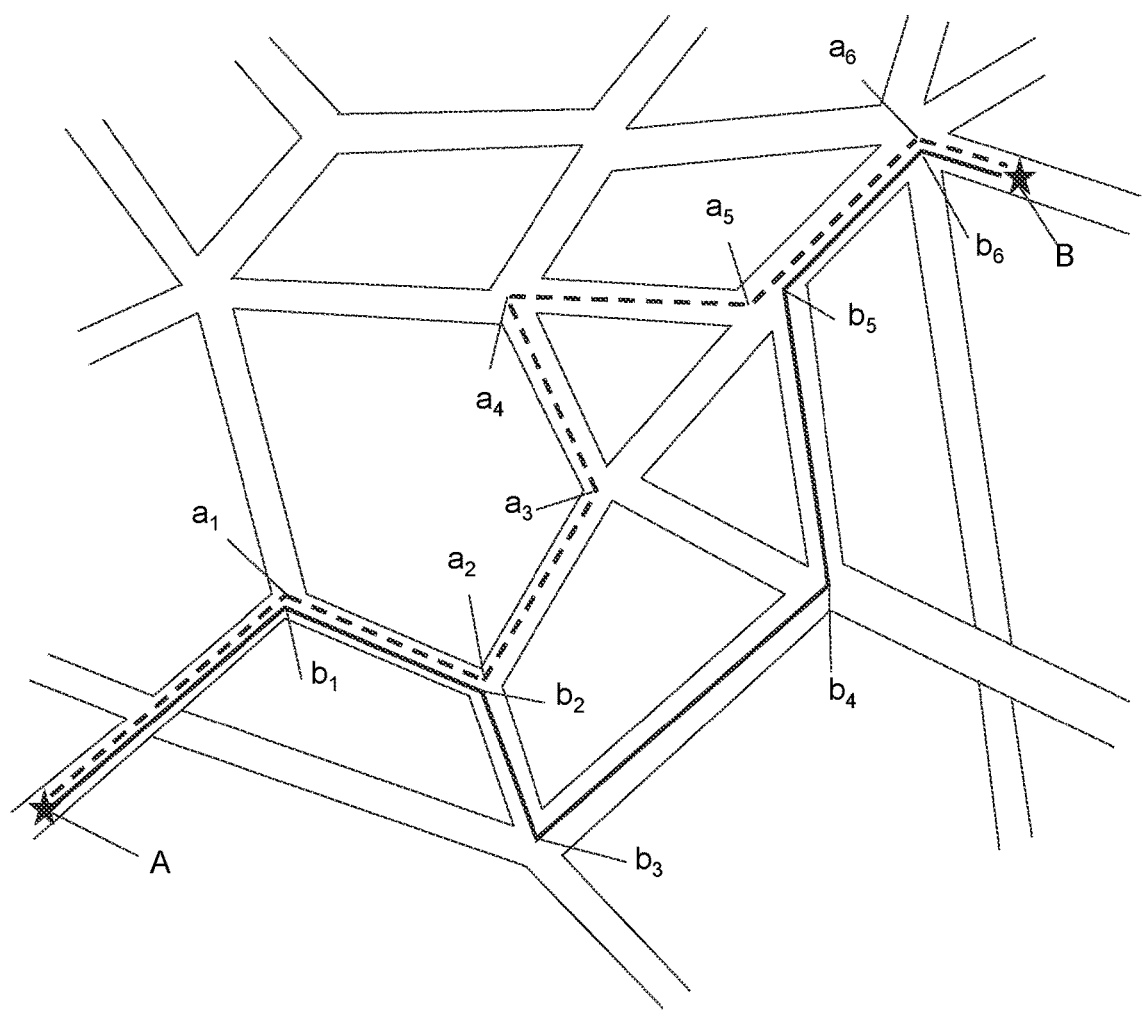
FIG. 4 illustrates an exemplary schematic diagram of a method for determining a government traffic route in a smart city according to some embodiments of the present disclosure.

The time when the preset route reaches the target location may refer to a time point when reaching the target location from the current location based on the preset route. For example, as shown in FIG. 4, A is the current location of the user, B is the target location, the user needs to go from A to B, and a1-a6 and b1-b6 are preset channels on the way from A to B, respectively. As shown in FIG. 4, the preset route may include A-a1-a2-a3-a4-a5-a6-B, A-b1-b2-b3-b4-b5-b6-B, A-a1-a2-b3-b4-b5-b6-B, and A-a1-a2-b3-b4-a5-a6-B, etc. Then time when the preset route reaches the target location may include the time when the user reaches B from the current location through the routes A-a1-a2-a3-a4-a5-a6-B, A-b1-b2-b3-b4-b5-b6-B, A-b1-b2-b3-b4-b5-b6-B, A-a1-a2-b3-b4-b5-b6-B and A-a1-a2-b3-b4-a5-a6-B reach B, etc. For more descriptions about the preset channel, please refer to operation 330 and its related descriptions.

As shown in FIG. 4, the route A-a1-a2-a3-a4-a5-a6-B is shorter than the route A-b1-b2-b3-b4-b5-b6-B, but it is possible that the passing time of preset channels a3 and a4 is much longer than that of the preset channels b3 and b4. Then, it is possible that the total time of the route A-a1-a2-a3-a4-a5-a6-B is much longer than the total time of the route A-b1-b2-b3-b4-b5-b6-B so choosing the route A-b1-b2-b3-b4-b5-b6-B is more appropriate.

In some embodiments, the query request received from the citizen user platform may be sent to the government traffic route determination management platform through the government service platform, and preliminary processing may be performed on the query request to form a query instruction that may be identified by the system.

In operation 330, the query instruction may be sent to the main platform of the government sensor network platform based on the government traffic route determination management platform, the main platform of the government sensor network platform may issue the query instruction to the corresponding sub-platforms platform of the government sensor network platform according to the type of traffic data information. In some embodiments, the operation 330 may be performed by government traffic route determination management platform 230.

The traffic data information may refer to the road traffic data in the preset route of the user from the current location to the target location. In some embodiments, the traffic data information may include itinerary information of the user, vehicle information of a preset route, channel information of a preset channel, or the like.

The itinerary information may refer to information such as the time and/or location of the user from the current location to the target location. In some embodiments, the itinerary information of the user may at least include the current location, the current time, and/or the user's target location of the user, or the like.

The vehicle information may refer to the information of one or more vehicles traveling in the preset route of the user from the current location to the target location. In some embodiments, the vehicle information may at least include vehicle speed, traffic flow, and/or vehicle type distribution, or the like. For example, the vehicle type distribution may include the brand, model, and/or power source of the vehicle.

The preset channel may refer to a checkpoint, that is prone to congestion, which needs to be passed by the user in the preset route from the current location to the target location. For example, the preset channel may include toll gates, toll booths, and/or entry and exit gates on the preset route. The preset channel may only allow one vehicle to pass at a time or may need to go through the formalities (payment), so it may be necessary to queue up to pass in turn, which is prone to congestion.

The channel information may refer to the relevant data information of the preset channel in the preset route of the user from the current location to the target location. In some embodiments, the channel information may at least include the initial passing time of the preset channel, and the transition matrix of the preset route and the preset channel. For example, the initial passing time may include the predicted passing time of the user according to the relevant data when the user is at the initial location. In some embodiments, the distance between the current location and the preset channel of the user may be used to construct a transition matrix between the preset route and the preset channel.

In some embodiments, the main platform of the government sensor network platform may include a plurality of sub-platforms platform of the government sensor network platform, and different sub-platforms platform of the government sensor network platform may be used to accept the query instructions of different traffic data information types issued by the main platform of the government sensor network platform. The main platform of the government sensor network platform may use different sub-platforms platform of the government sensor network platform for data storage, data processing, and/or data transmission for data of different object platforms, and different sub-platforms platform of the government sensor network platform correspond to different traffic data information.

In operation 340, the government sensor network platform may send the query instruction to the corresponding object platform. In some embodiments, the operation 340 may be performed by the government sensor network platform 240.

In some embodiments, the government sensor network platform may send the query instruction to the corresponding object platform.

In operation 350, the traffic data information may be obtained based on the at least one object platform according to the query instruction, wherein the traffic data information includes the itinerary information of the user, the vehicle information of the preset route, and the channel information of the preset channel. In some embodiments, the operation 350 may be performed by object platform 250.

In some embodiments, the at least one object platform may obtain traffic data information according to relevant query instructions. For example, the at least one object platform may obtain vehicle information of a preset route and channel information of a preset channel based on the road monitoring device and/or the drone monitoring device. For example, the object platform may obtain the itinerary information of the user based on the user terminal.

For more descriptions of the traffic data information, please refer to operation 330 and its related descriptions.

In operation 360, the traffic data information may be uploaded to the government traffic route determination management platform through corresponding sub-platforms of the government sensor network platform and the main platform of the government sensor network platform respectively based on the object platform, the time when each preset route reaches the target location may be determined based on the traffic data information by the government traffic route determination management platform. In some embodiments, the operation 360 may be performed by the object platform 250.

The traffic data information being uploaded to the government traffic route determination management platform through corresponding sub-platforms of the government sensor network platform and the main platform of the government sensor network platform respectively based on the object platform is the reverse process of sending the query instruction to the object platform based on the government traffic route determination management platform and it will not be repeated here.

In some embodiments, the government traffic route determination management platform may determine the time when each preset route reaches the target location through a time prediction model based on the traffic data information. For more explanation about how to determine the time when each preset route reaches the target location, please refer to FIG. 5 and its related descriptions.

In operation 370, the time when each preset route reaches the target location may be determined through a time prediction model based on the traffic data information by the government traffic route determination management platform. In some embodiments, the operation 370 may be performed by the government traffic route determination management platform 230.

The time when each preset route reaches the target location being fed back to the citizen user platform through the government service platform based on the government traffic route determination management platform is the inverse process of the above-mentioned transmission process of the user demand, the query instruction, and it will not be repeated here.

In some embodiments, since the vehicle information of the preset route may change constantly, the initial passing time of the preset channel may also change constantly, and the government traffic route determination management platform may keep real-time updates of the time when each preset route reaches the target location. For example, the government traffic route determination management platform may repeat operations 330 to 370 at regular intervals (for example, 10 min, 30 min, 60 min, etc.), so as to feed back the updated time when each preset route from the current position to the target position reaches the target position to the citizen user platform.

Through the method for determining a government traffic route in a smart city described in some embodiments of the present disclosure, it can be implemented to recommend the route from the current location to the target location of the user to the user, and the time when the target location is reached. The citizen users may choose a more reasonable route based on the recommended information, which may reduce the time it takes for citizen users to reach the target location, improve travel efficiency, and may also achieve a certain diversion effect and reduce channel congestion. In addition, the government traffic route determination management platform may also keep real-time updates of the time when each preset route reaches the target location during the driving process of the user, thereby providing more accurate reference information and improving user experience.

It should be noted that the above description about the process 300 is only for example and illustration, and not limit the scope of application of the present disclosure. For those skilled in the art, various modifications and changes may be made to the process 300 under the guidance of the present disclosure. However, these modifications and changes are still within the scope of the present disclosure. For example, the process 300 may also include preprocessing operations.

Figure 5:
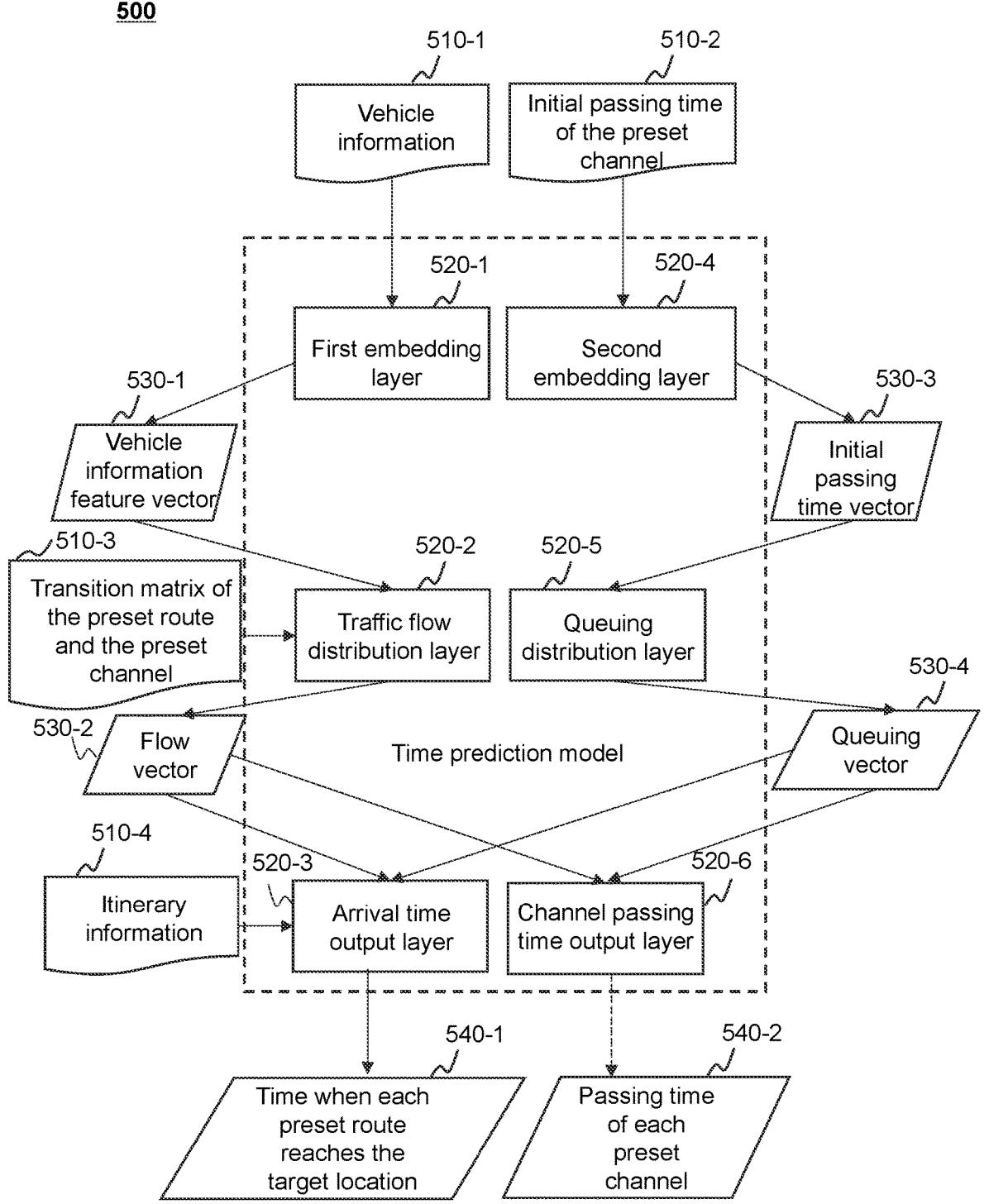
FIG. 5 illustrates a schematic diagram of the structure of a time prediction model according to some embodiments of the present disclosure.

FIG. 5 illustrates a schematic diagram of the structure of a time prediction model according to some embodiments of the present disclosure.

As shown in FIG. 5, in some embodiments, the time prediction model 500 may include a first embedding layer 520-1, a traffic flow distribution layer 520-2, an arrival time output layer 520-3, and a second embedding layer 520-4, a queuing distribution layer 520-5, and a channel passing time output layer 520-6, etc.

In some embodiments, the first embedding layer 520-1, the traffic flow distribution layer 520-2, the arrival time output layer 520-3, the second embedding layer 520-4, the queuing distribution layer 520-5, and the channel passing time output layer 520-6 may include Convolutional Neural Networks (CNN), Deep Neural Networks (DNN), or any combination thereof. In some embodiments, the traffic prediction model 500 may respectively analyze such as the input vehicle information 510-1, the initial passing time 510-2 of the preset channel, the transition matrix 510-3 of the preset route and the preset channel, and the itinerary information 510-4 of the user to obtain the time 540-1 when each preset route reaches the target location. In some embodiments, the output of the traffic prediction model 500 may also include the passing time 540-2 of each preset channel.

In some embodiments, the input of the first embedding layer 520-1 may include vehicle information 510-1, and the output of the first embedding layer 520-1 may include vehicle information feature vector 530-1. In some embodiments, the vehicle information feature vector 530-1 may reflect vehicle speed, traffic flow, and/or vehicle type distribution on one or more preset routes.

In some embodiments, the input of the traffic flow distribution layer 520-2 may include the output vehicle information feature vector 530-1 of the first embedding layer 520-1 and the transition matrix 510-3 of the preset route and the preset channel, and the output of the traffic flow distribution layer 520-2 may include flow vector 530-2. In some embodiments, the flow vector 530-2 may reflect traffic flow information on the preset route. For more descriptions about the transition matrix 510-3 of the preset route and the preset channel, please refer to FIG. 3 and its related descriptions.

In some embodiments, the input of the arrival time output layer 520-3 may include the output flow vector 530-2 of the traffic flow distribution layer 520-2, the output queuing vector 530-4 of the queuing distribution layer 520-5, and itinerary information 510-4 of the user, the output of the arrival time output layer 520-3 may include the time 540-1 when each preset route reaches the target location. For more information about the queuing distribution layer, please refer to the related descriptions below.

In some embodiments, the input of the second embedding layer 520-4 may include the initial passing time 510-2 of the preset channel, and the output of the second embedding layer 520-4 may include the initial passing time vector 530-3. In some embodiments, the initial passing time vector 530-3 may reflect the initial passing time of one or more preset channels.

In some embodiments, the input of the queuing distribution layer 520-5 may include the output initial passing time vector 530-3 of the second embedding layer 520-2, etc., and the output of the queuing distribution layer 520-5 may include the queuing vector 530-4. In some embodiments, the queuing vector 530-4 may reflect the initial queuing information of the preset channel.

In some embodiments, the input of the channel passing time output layer 520-6 may include the output queuing vector 530-4 of the queuing distribution layer 520-5 and the output flow vector 530-2 of the traffic flow distribution layer 520-2, the output of the channel passing time output layer 520-6 may include the passing time 540-2 of each preset channel.

In some embodiments, the time prediction model 500 may be obtained based on training, and the training of the time prediction model 500 may be performed by a processing device. For example, the training of the time prediction model 500 may be implemented based on separate training of the first embedding layer 520-1, the traffic flow distribution layer 520-2, arrival time output layer 520-3, the second embedding layer 520-4, the queuing distribution layer 520-5, and the time output layer 520-6.

In some embodiments, the training of the time prediction model 500 may be implemented based on joint training of the first embedding layer 520-1, the traffic flow distribution layer 520-2, arrival time output layer 520-3, the second embedding layer 520-4, the queuing distribution layer 520-5, and the time output layer 520-6. For example, the time prediction model 500 may be obtained by training based on the plurality of training samples. The training samples may include historical vehicle information, initial passing time information of historical preset channels, transition matrix information of historical preset route and preset channel, historical user itinerary information and their labels. The label represents the historical time when each preset route reaches the target location and the historical passing time of each preset channel.

In some embodiments, a first loss function and a second loss function may be constructed for the training of the time prediction model 500. The weight of the time when each preset route reaches the target location in the first loss function is larger, and the weight of the passing time of each preset route in the second loss function is larger, and the weights of the first loss function and the second loss function are adjusted alternately. The above operations are iteratively performed until the time prediction model satisfies the preset condition. For example, the time when a preset route reaches the target location and the passing time of each preset channel on the preset route are respectively used as variables of the respective loss functions and are adjusted alternately until the two loss functions meet the preset conditions. The preset conditions may be that the loss function is smaller than the threshold, the loss function converges, or the training period reaches the threshold, or the like.

In some embodiments, the samples may be divided into multiple batches, and the first type of training method and the second type of training method may be used in turn to adjust the parameters of the loss function alternately. For example, let A=the time when the preset route reaches the target location/the sum of the passing time of each preset channel on the preset route. The larger the value A of the sample is, the smaller the proportion of the total passing time of each preset channel of the sample on the preset route is; the smaller the value A of the sample is, the larger the proportion of the total passing time of each preset channel on the preset route is. The first type of training method pays attention to the time of not passing the preset channel in the process of the preset route reaching the target position, and the time when each preset route reaches the target position in the loss item is set relatively large. At this time, it may be considered that the sample with a small value A is a low-quality sample, and further, the weight of the low-quality sample may be set to a smaller value, such as using improved FocalL1 Loss, etc., the second type of training method is to increase the weight of the passing time of each preset channel in the loss item on the basis of the first batch of training, and pays attention to the time estimation of the passing preset channel. At this time, it may be considered that a sample with a larger value A is a low-quality sample, and further, the weight of the low-quality sample may be set to a smaller value, for example, an improved FocalL1 Loss may be used.

In some embodiments of the present disclosure, the time prediction model may have a multi-layer structure and may input and output multiple parameters at the same time, which may improve the prediction efficiency while improving the prediction accuracy. In addition, in terms of model training, batch training may make model training better, reduce the shock of loss function results, and solve the problem of imbalanced high/low quality sample categories. The Joint training is beneficial to solve the problem of difficulty in obtaining labels when training the first embedding layer, the traffic flow distribution layer, the second embedding layer, and the queuing distribution layer separately, which may not only reduce the count of samples needed, but also improve the training efficiency.

In some embodiments, a non-transitory computer-readable storage medium storing may be used for storing computer instructions, when executed by at least one processor, causing the at least one processor to perform the method for determining a government traffic route in a smart city.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for determining a traffic route in a smart city, implemented based on an Internet of Things system for determining the traffic route in the smart city, wherein the smart city is a city where the Internet of Things system is applied to city management, and the Internet of Things system for determining the traffic route in the smart city includes a citizen user platform, a service platform, a traffic route determination management platform, a sensor network platform, and at least one object platform;

the method comprising:

receiving a query request for a preset route initiated by a user based on the citizen user platform;

transmitting the query request to the traffic route determination management platform based on the service platform, and generating a query instruction based on the traffic route determination management platform, wherein the query instruction includes a time when each preset route reaches a target location;

sending the query instruction to a main platform of the sensor network platform based on the traffic route determination management platform; sending the query instruction to sub-platforms of the sensor network platform based on traffic data information by the main platform of the sensor network platform; using different sub-platforms of the sensor network platform for data storage, data processing, or data transmission for data of different object platforms by the sensor network platform; wherein the different sub-platforms of the sensor network platform correspond to different traffic data information;

sending the query instruction to corresponding object platform based on the sub-platforms of the sensor network platform;

obtaining the traffic data information based on the at least one object platform according to the query instruction, wherein the traffic data information includes itinerary information of the user, vehicle information of the preset route, and the channel information of a preset channel, wherein the channel information is relevant data information of the preset channel in the preset route of the user from a current location to the target location;

uploading the traffic data information to the traffic route determination management platform through corresponding sub-platforms of the sensor network platform and the main platform of the sensor network platform respectively based on the object platform; determining the time when each preset route reaches the target location through a time prediction model based on the traffic data information by the traffic route determination management platform, wherein a structure of the time prediction model includes a first embedding layer, a traffic flow distribution layer, and an arrival time output layer, and the time prediction model is a machine learning model obtained through a training process, comprising:

constructing a first loss function and a second loss function, wherein a weight of the time when each preset route reaches the target location in the first loss function is greater than a weight of passing time of each preset channel in the first loss function, and a weight of the passing time of each preset channel in the second loss function is greater than a weight of the time when each preset route reaches the target location in the second loss function;

alternately adjusting the weight of the first loss function and the weight of the second loss function; and iteratively performing above operations until the time prediction model satisfies a preset condition; and feed backing the time when each preset route reaches the target location to the citizen user platform through the service platform based on the traffic route determination management platform.

2. The method according to claim 1, wherein an output of the time prediction model further includes a passing time of each preset channel.

3. The method according to claim 1, wherein the structure of the time prediction model further includes a second embedding layer, a queuing distribution layer, and a channel passing time output layer.

4. The method according to claim 3, wherein a flow vector output by the traffic flow distribution layer is used as an input of the channel passing time output layer; and a queuing vector output by the queuing distribution layer is used as an input of the arrival time output layer.

5. A non-transitory computer-readable storage medium storing a set of instructions, when executed by at least one processor, causing the at least one processor to perform the method for determining a traffic route in a smart city according to claim 1.

6. An Internet of Things system for determining a traffic route in a smart city, wherein the smart city is a city where the Internet of Things system is applied to city management, and the Internet of Things system includes a citizen user platform, a service platform, a traffic route determination management platform, a sensor network platform, and at least one object platform;

the citizen user platform is configured to receive a query request for a preset route initiated by a user;

the service platform is configured to transmit the query request to the traffic route determination management platform, and generate a query instruction based on the traffic route determination management platform, wherein the query instruction includes a time when each preset route reaches a target location;

the traffic route determination management platform is configured to send the query instruction to a main platform of the sensor network platform; the main platform of the sensor network platform is configured to send the query instruction to sub-platforms of the sensor network platform based on-a traffic data information;

the sub platforms of the sensor network are configured to send the query instruction to the corresponding object platform; the sensor network platform is configured to use different sub-platforms of the sensor network platform for data storage, data processing, or data transmission for data of different object platforms; wherein the different sub-platforms of the sensor network platform correspond to different traffic data information;

the at least one object platform is configured to obtain the traffic data information according to the query instruction, wherein the traffic data information includes itinerary information of the user, vehicle information of the preset route, and the channel information of a preset channel, wherein the channel information is the relevant data information of the preset channel in the preset route of the user from a current location to the target location;

the at least one object platform is configured to upload the traffic data information to the traffic route determination management platform through corresponding sub-platforms of the sensor network platform and the main platform of the sensor network platform respectively;

the traffic route determination management platform is further configured to determine the time when each preset route reaches the target location through a time prediction model based on the traffic data information, wherein a structure of the time prediction model includes a first embedding layer, a traffic flow distribution layer, and an arrival time output layer, and the time prediction model is a machine learning model obtained through a training process, the traffic route determination management platform is further configured to:

construct a first loss function and a second loss function, wherein a weight of the time when each preset route reaches the target location in the first loss function is greater than a weight of the passing time of each preset channel in the first loss function, and a weight of the passing time of each preset channel in the second loss function is greater than a weight of the time when each preset route reaches the target location in the second loss function;

alternately adjust the weight of the first loss function and the weight of the second loss function; and iteratively perform above operations until the time prediction model satisfies a preset condition; and the traffic route determination management platform is further configured to feed back the time when each preset route reaches the target location to the citizen user platform through the service platform.

* * * * *